भारत

3,230,104
ASPHALT EMULSIONS AND METHOD OF MAKING SAME

Charles W. Falkenberg, Westbury, Ronald A. Paley, Brooklyn, and John J. Patti, Hollis, N.Y., assignors to Components Corporation of America, Jamaica, N.Y., a corporation of New York
No Drawing. Filed Mar. 7, 1962, Ser. No. 177,978
12 Claims. (Cl. 106—277)

This invention relates to a process for producing cationic asphalt emulsions capable of giving satisfactory service with both acidic and basic aggregates, and to the asphalt emulsions produced thereby.

The terms "asphalt" as used herein is applied to an asphalt suitable for direct use in highway work, roofing, and also for other purposes, and includes asphalts brought to a consistency desired for particular use, either by distillation or by mixing or fluxing with a harder or a softer asphalt, as the case may be. The term "asphalt" also includes asphaltic rocks, tars and pitches obtained in the distillation of coal or wood, or obtained from petroleum residues, cracking coal tars, or other types of natural asphalts. A type of asphalt to which the method of this invention is particularly applicable is commonly known as "asphalt cement." Asphalt cement is a highly viscous product obtained by oxidizing or steamblowing a petroleum residue to increase its penetration.

In using asphalt in road paving operations, three different procedures are employed. In one procedure adapted for use of asphalt cement, the asphalt is heated until free-flowing, and then mixed directly with the aggregate, which may also be heated. In a second procedure, to enable application of asphalt to aggregate at room temperature, the asphalt is dissolved in a hydrocarbon solvent. Such compositions are known as "cut-back" asphalts. This method of asphalt application is expensive not only because of the solvent but also because considerable time is required to remove the solvent once mixing has been completed.

In the third method, the asphalt is emulsified with water. The emulsion can either be of the so-called oil-in-water type in which the asphalt is emulsified in the inner phase, or the emulsion can be of the water-in-oil type in which water is in the inner phase. The particles of asphalt in the emulsion range from about one to about twenty microns in size, and the emulsion is free-flowing at ordinary temperatures. Asphalt emulsions are generally made in three types: "RS" or rapid setting type, "MS" or medium setting type, and "SS" or slow setting type. The "RS" type is subdivided into two categories having different viscosities, namely, "RS–1" and "RS–2."

Asphalt emulsions are prepared by dispersing molten asphalt in water in the presence of an emulsifying agent, to form a cationic, anionic or nonionic emulsion, the character of the emulsion depending upon the nature of the emulsifying agent. The cationic and anionic emulsions are much more common than the nonionic emulsions.

Asphalt emulsions must meet five important criteria, i.e., stability, demulsibility, asphalt content, viscosity, and ability to adhere to aggregate under operating conditions.

The last requirement, namely adhesion, is particularly important and is more significant in the case of emulsions than in the case of asphalt cements. Since asphalt cements are generally applied hot to dry aggregate, it is not as difficult to secure adhesion when the asphalt is mixed with aggregate although, for best results, anti-stripping agents are often employed. In the case of asphalt emulsions, however, the water tends to wet the aggregate before the asphalt touches it. In fact, one of the advantages attributed to asphalt emulsions is the ability to use a wet aggregate during construction, thereby eliminating the additional expense of drying and preheating the aggregate.

U.S. Patent No. 2,426,220 to Johnson discloses that acyl amidoamine soaps are useful as anti-stripping agents to increase the adhesion of molten or "cut-back" asphalt to aggregate. The patent teaching the direct incorporation, by solution or emulsion, of the soap with the asphalt. In one modification, the patentee suggests that the soap can be first associated with water to form a treating composition and thereafter added to the asphalt in the proportion of from 0.5 to 3 parts of treating composition per 100 parts of asphalt. U.S. Patent No. 2,891,873 to Falkenberg et al. indicates that better results are obtained when the asphalt is associated with both an amidoamine soap and an excess of amine. Falkenberg et al. disclose the direct addition of soap and amine to asphalt. Neither Johnson nor Falkenberg et al. faced the problem of improving the adhesion to aggregate of asphalt emulsions with which a large proportion of water is conventionally associated.

Asphalt emulsions are notoriously poor in adhesion properties and even the best of them conventionally have only a limited range of utility. Each emulsion is frequently suitable only for use with a very limited proportion of a particular type of aggregate.

One of the major factors affecting adhesion is whether the emulsion is anionic or cationic. The two most common types of aggregate in use in the United States are the limestones and other calcium-containing materials, and the siliceous materials. In the presence of water, molecules on the surface of limestone and other calcareous aggregates will dissociate and the aggregate will thereby acquire an electropositive surface charge. Siliceous aggregates, on the other hand, will acquire an electronegative surface charge.

Poor adhesion has typically been exhibited between anionic asphalt emulsions and electronegative siliceous aggregates, and between cationic asphalt emulsions and electropositive calcareous aggregates. Adhesion-improving agents have been used to remedy the adhesion problems, but have to be very carefully matched with the type of aggregate and the expected application conditions.

The present invention is directed to cationic asphalt emulsions which display good adhesion to both calcareous and siliceous aggregates, due to the unusual and unexpected ability of amidoamine soaps of the structure to be described to wet both siliceous and calcareous aggregates. Both these types of aggregates, in the persence of both water and an amidoamine soap, are preferentially wet by the amidoamine soap, and the deleterious effect of water on the adhesive bond between asphalt and aggregate is thereby substantially reduced. As a result, the asphalt emulsions of this invention are all-purpose materials and can be prepared without reference to the type of aggregate with which they are to be employed.

It is immaterial whether the amidoamine soap is present in the asphalt phase or the water phase of the emulsion. The asphalt emulsions are prepared by adding an amidoamine soap, an aqueous solution of an acid, and, if desired, a stabilizer for the acid, to water and asphalt in either order, and thereafter the water and asphalt are emulsified.

The amidoamine soap employed in this invention is of the structure:

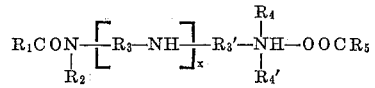

$R_1$ and $R_5$ each represents the same or a different organic group having from about six to about twenty carbon atoms. $R_1$ and $R_5$ can be alkyl, cycloalkyl, heterocyclic, aryl, alkylaryl and arylalkyl. Preferably $R_1$ and $R_5$ are alkyl groups having 11 to 19 carbon atoms or abietyl radicals.

$R_2$, $R_4$ and $R_4'$ are selected from among hydrogen and organic groups containing from one to about nineteen carbon atoms including alkyl groups such as methyl, ethyl, propyl, isopropyl, n-butyl, isobutyl, tert-butyl, sec-butyl, octyl, docecyl and stearyl, cycloalkyl groups such as cyclohexyl, aryl groups such as phenyl and naphthyl, alkaryl and aralykyl groups such as benzyl, phenethyl, and methyl phenyl, and hetaerocyclic groups such as piperidyl. $R_4$ and $R_4'$ can also be taken together to form a heterocyclic group with the quaternary nitrogen atom. For example, the structure

can be a piperidinium group:

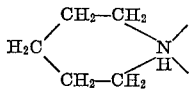

$R_3$ and $R_3'$ are bivalent organic radicals having from two to about eighteen carbon atoms including alkylene, arylene, arylalkylene, alkylarylene, and heterocyclic groups. $R_3$ and $R_3'$ are preferably alkylene groups.

$x$ is an integer from zero to four.

Representative $R_1$ and $R_5$ groups include hexyl, isohexyl, heptyl, n-octyl, 2-ethyl hexyl, isooctyl, nonyl, undecyl, tridecyl, pentadecyl, heptadecyl, heptadecanyl, abietyl $C_{19}H_{29}$, the principal cyclic acid of tall oil, phenyl, benzyl, alpha-phenethyl, cyclopentyl, quinolyl, naphthyl, tolyl, xylyl and thienyl.

$R_3$ and $R_3'$ can be, for example, ethylene, propylene, alpha-methyl and alpha, beta-dimethylethylene, butylene, alphaethyl butylene, hexylene, decylene, dodecylene, octadecylene, phenylene, naphthylene, toluenyl and radicals including such groups as

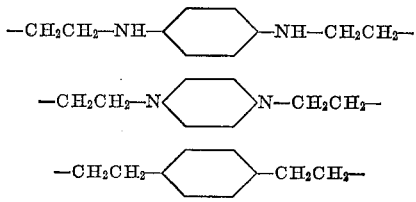

and

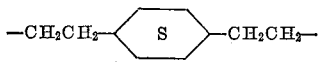

Some representative amidoamine soaps applicable in this invention include that made from oleic acid and ethylene diamine, having the formula

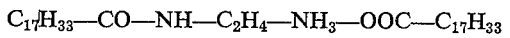

that made from abietic acid and ethylene diamine, having the formula

a stearic acid diethylene triamine reaction product of the formula

and compounds in which the $NH_2$ in these formulas is the residue of a tertiary amine, as for instance $N(C_2H_5)_2$, $N(C_3H_7)_2$, $N(C_4H_9)_2$. To provide the residue $N(C_2H_5)_2$, for example, in the amidoamine soap, the amine to be reacted with the selected acid R—COOH is

The amidoamine soaps used in this invention are made in accordance with conventional procedures, which essentially involve mixing a selected organic acid or mixture of acids with an excess of a polyamine and reacting them to form a polyamine soap, and then heating the soap until one of the soap groups is converted to an amine group.

In addition to the amidoamine soap itself, the amidoamine soap composition which is to be added to the asphalt preferably contains a large amount of free amine, preferably a polyamine. This amine can be the same polyamine used to make the soap, or it can be a different amine, or a mixture of amines. Suitable amines contain from about two to about eighteen carbon atoms and from one to about five amine groups. Representative amines include decylamine, ethylene diamine, octadecylamine, propylene, diamine, octylamine, diethylene triamine, triethylene tetramine, tetraethylene pentamine, bis-3-aminopropylmethylamine, phenylene diamine, naphthylamine and toluidine.

The amine used to form the soap can also be an amidoamine, for example, oleylamidoamine. To obtain an amidotertiary-amine soap, these amines are replaced by amines different from the examples only in the replacement of one $NH_2$ group by $N(CH_3)_2$, $N(C_2H_5)_2$, $N(C_3H_7)_2$, or $N(C_4H_9)_2$ in the selected amine. When the amidoamine soap composition is to be added to the asphalt phase, it is preferable that an amine be used having a boiling point above the addition temperature so as to avoid any loss by volatilization. When the soap composition is to be added to the water phase, the amine should have a boiling point above the temperature achieved after emulsification.

If the excess amine is to be the soap-forming amine, there should be a large excess of amine over the amount theoretically required to react with the acid to form the amidoamine soap. Ordinarily, these amidoamine soap compositions should have a total amine content equivalent to about 4.5 equivalent weights of amines per mole of organic acid up to about 25 equivalents of amine per mole or organic acid. The amount of unreacted amine in the final amidoamine soap composition is in an amount from about 2.5 to about 22.5 moles of amine for each mole of amidoamine soap. The use of too much amine should be avoided as it results in unnecessary dilution of the amidoamine soap.

When the amidoamine soap composition is to be contained in the asphalt phase, conventional blending techniques can be employed. A preferred method of carrying out this mixing operation involves heating the asphalt until molten and free flowing, usually at about 240 to 270° F., depending on the penetration of the asphalt, and dispersing therein the requisite amount of amidoamine soap composition. Generally, from about 0.1 to about 2.5 parts of amidoamine soap composition can be mixed with 100 parts by weight of asphalt. The best results are obtained with from about 0.1 to about 0.4 part by weight of amidoamine soap composition.

When the amidoamine soap composition is in the asphalt phase, the aqueous phase of the asphalt emulsion will comprise water, a strong acid, and, if desired, an inorganic stabilizer. The preferred acids are hydrochloric and phosphoric acids. However, any acid having a primary ionization constant greater than about $1.7 \times 10^{-5}$ can be employed, such as sulfuric acid, acetic acid, formic acid and dichloroacetic acid. The amount of acid employed is not critical, but optimum results are obtained when the pH of the aqueous phase is lowered to about 2. In general, the pH of the aqueous phase can be from about 1 to 3. Generally, from about 0.3 to about 2 parts of concentrated acid by weight per 100 parts by weight of water in the aqueous phase are sufficient to lower the pH to the desired level.

If desired, a small amount of a stabilizer for the acid can be employed. Such a stabilizer would be a metal salt of the acid. For example, where hydrochloric acid is employed, a small amount of calcium chloride may be employed, to maintain a sufficient number of chloride ions in solution, thereby keeping the pH at a constant level. The sodium or potassium salts would also be satisfactory. Where employed, such a stabilizer can be added in an amount from about 0.2 to about 1.0 part by weight per part of acid.

The amidoamine soap composition can be added to the aqueous phase instead of the asphalt phase. In that event, the amidoamine soap composition can be dispersed in the water phase in accordance with the conventional techniques. It is advantageous to render the soap soluble in water and this can be done by adding to the water an approximately stoichiometric amount of a strong acid, preferably hydrochloric or phosphoric acid, but any acid having a primary ionization constant above about $1.7 \times 10^{-5}$ can be employed. From about 0.9 to 1.5 moles of acid per mole of amidoamine soap can generally be employed. The pH of the aqueous phase should preferably be less than 7. As above a suitable stabilizer for the acid can be employed. The amount of amidoamine soap composition added to the aqueous phase should be such that there will be from about 0.1 to about 2.5 parts, preferably about 0.1 to 0.4 part, by weight of amidoamine soap composition per 100 parts of asphalt in the asphalt phase of the final emulsion.

Regardless of in which phase the amidoamine soap composition is contained, the ratio of asphalt phase to the aqueous phase in the final emulsion will vary to some extent, depending upon the properties desired of the final emulsion and upon the applicable statutory provisions. Preferred compositions are those in which the final asphalt emulsion contains from about fifty to about seventy parts by weight of the asphalt phase and from about thirty to about fifty parts by weight of the aqueous phase. Particularly good results are obtained when the final emulsion contains from about fifty to about sixty percent of emulsified asphalt.

In the practice of this invention, the asphalt composition is heated until flowable, generally from about 240° F. to about 270° F. depending on the penetration of the asphalt, and thereafter is blended with the aqueous phase in the emulsification apparatus such as homogenizer, disperser or colloid mill. One or the other or, if desired, both of the two phases will contain an imidoamine soap composition as above described. The temperature of the aqueous phase should be adjusted so that at the volume of aqueous phase used, the temperature of the final emulsion is below the boiling point of water, preferably between 170 and 200° F. Cooling can be employed to prevent boiling of the water. Satisfactory results are obtained when the aqueous phase enters the emulsification apparatus at a temperature of from about 105° F. to about 130° F.

The pH of the final emulsion should be slightly on the acid side to retain good stability, that is, a low settling rate, and good viscosity. A pH of between five and seven, preferably about six, is generally satisfactory.

It has been found that asphalt emulsions made in accordance with this invention exhibit the requisite degrees of stability, demulsibility, asphalt content, viscosity and adhesion to widely varying types of aggregate under varying conditions of application.

Aggregates normally constitute as much as ninety percent or more by weight of asphalt-aggregate mixtures. The most commonly used aggregates are broken stone and slag, crushed or uncrushed gravel, disintegrated granite, sand and mineral filler. The type of asphalt and the ultimate properties desired determine the type of aggregate to be employed. Chemically, these aggregates can comprise calcium carbonate, calcium silicate, silicon dioxide and various iron, aluminum and other mineral-containing substances.

Further details on methods of combining aggregate and asphalt emulsions and on proper proportions of the various sizes of aggregate for use in different construction applications may be found in a publication, The Asphalt Handbook, Revised edition, 1960, published by The asphalt Institute, College Park, Maryland.

The method of mixing aggregate with asphalt emulsion is primarily dependent upon the characteristics of the emulsion. When the emulsion is of the "RS" type, the aggregate is generally spread on the surface to be covered and hot asphalt emulsion is spread over it and allowed to cool. When an "MS" emulsion is used, the aggregate and asphalt emulsion are mixed just prior to use and the mixture is then spread on the surface. "SS" type asphalt emulsions can be mixed with aggregate and stored for reasonable periods of time.

The following examples represent, in the opinion of the inventors, the preferred mode of carrying out their invention.

EXAMPLE I 0.5 part by weight of an amidoamine soap composition and 69 parts by weight of amulsion grade asphalt cement having a penetration rating of from 150 to 200 were mixed at a temperature of 240° F. The amidoamine soap composition was prepared by reacting 15 parts of diethylene triamine containing 85 percent of diethylene triamine and 15 percent of higher polyamines and having an equivalent weight as an amine of about 37 (about 0.13 mole or 0.39 equivalent) with 40 parts by weight of crude tall oil of equivalent weight about 330 (about 0.12 mole). After the initial reaction, the mixture was heated until sufficient water was lost to correspond to approximately 0.5 mole for each mole of tall oil fatty acid used, and thus leave an amidoamine soap of the formult

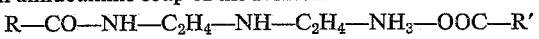

in which the organic acids represented in the R-CO and OOC-R′ groups are those derived from tall oil. The reaction product so produced was then mixed with additional diethylene triamine in the amount of 40 parts by weight (about 0.36 mole) so as to provide a large excess of the diethylene triamine in the final amidoamine soap composition. The total amine used was approximately 0.49 mole (1.47 equivalent) for the 0.12 mole of organic acid in the tall oil.

An aqueous phase was prepared consisting of 30.2 parts by weight of water, 0.2 part by weight of 22° Baumé hydrochloric acid and 0.1 part by weight of calcium chloride.

The asphalt phase was maintained at a temperature of 240° to 260° F. and charged to a colloid mill along with the aqueous phase which was preheated to a temperature of 115° F. The final emulsion which was of the "MS" type and at a temperature of about 180–200° F. and a pH of about 6.5 was stored in standard asphalt emulsion containers.

This asphalt emulsion composition was found to meet all state requirements for stability of asphalt emulsions. When mixed with aggregates consisting essentially of limestone, good adhesion properties were observed. Likewise, when mixed with aggregates consisting essentially of silica, good adhesion results were obtained. Results obtained when the emulsion prepared above was mixed with various aggregates are shown in Table I. The testing procedure used was that described in ASTM Standard D244–61T for the coating of dry aggregate. The same test was repeated using in place of the amidoamine soap composition of this invention, a commercial cationic emulsifying agent of the formula

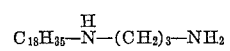

which is formed by hydrogenating the reaction product of stearic nitrile and acrylonitrile. The percentages recorded in Table I are the estimated percentages of the surface area of the aggregate coated by asphalt after the mixture has been surface air-dried at 75° F. ±10° F. The significance of the percentages can be understood by reference to the fact that most state statutes require that asphalt emulsions show a rating of at least 80 to 85%. The agggregates employed in the examples are the standard state references aggregate of the particular states indicated.

Table I

| State | Aggregate | | Additive | |
| --- | --- | --- | --- | --- |
| | Type | Surface Charge | Amidoamine Soap Comp. of Example I-Percent Coated | Hydrogenated Reaction Product of Stearic Nitrile & Acrylonitrile, Percent Coated |
| Pennsylvania | Silica | Negative | 100 | 100 |
| Illinois | Kankakee Limestone. | Positive | 85 | 65–70 |
| Wyoming | Laramie Chat. | Negative | 95–98 | 95–98 |
| Massachusetts | Rhyolite. | do | 100 | 100 |
| Colorado | Silica | do | 100 | 95 |
| Kansas | Kansas Semple. | Positive | 80 | 65–70 |

Table I shows that when the asphalt emulsions of this invention are used in connection with aggregates having an electronegative surface charge, the adhesion obtained is as good, if not better, than that obtained with a conventional cationic emulsifying agent. The conventional cationic emulsions failed to coat the electropositive limestone samples sufficiently to meet state specifications, while the samples coated with the asphalt emulsions of this invention were vastly superior. Accordingly, the asphalt emulsions of this invention can be used with either electropositively or electronegatively charged aggregates, whereas the conventional cationic asphalt emulsion tested can be used successfully only with the electronegatively charged aggregate.

EXAMPLE II

The procedure of Example I was followed using an amidoamine soap composition made by mixing red oil in an amount to provide one mole of higher fatty acids with one mole of 3,3'-(methylamino)-bis-propylamine and heating until the amine and acid were completely reacted and 0.5 mole of water removed for each mole of the amine soap first formed. More amine was then added to provide 50 parts by weight of the amine for 100 parts of the reaction product after loss of the water.

The asphalt emulsion was found to be very stable and to give satisfactory adhesion when mixed with either calcareous or siliceous aggregates.

EXAMPLE III

The procedure of Example I was followed using as the amidoamine soap the product of the reaction at 150° C. for four hours of one mole of each of oleic acid and dimethylamino-ethylamine to which was later added two moles of diethylene triamine. Equally good results were obtained.

EXAMPLE IV

The procedure of Example III was followed except that the diethylene triamine was replaced by 1.5 moles of 3,3'-(methylamino)-bis-propylamine. Equally good results were obtained.

EXAMPLE V 0.3 part of an amidoamine soap composition prepared in accordance with Example I and 0.1 part of calcium chloride were added to 40 parts of water containing one mole of HCl per mole of amidoamine soap at a temperature of 115° F. Sixty parts of an emulsion grade asphalt composition having a penetration rating of from 150 to 200 were heated to 240° F. and emulsified with the water-amidoamine soap composition mixture to form an emulsion in which the amidoamine soap composition was contained in the aqueous phase. Tests conducted in accordance with ASTM Standard D244–61T showed results equivalent to those obtained in Example I when the amidoamine soap composition was contained in the asphalt phase.

We claim:

1. An asphalt emulsion displaying good adhesion to both limestone and siliceous aggregates consisting essentially of from 30 to 50 parts by weight of an acidic aqueous phase comprising an acid having an ionization constant greater than about $1.7 \times 10^{-5}$ in an amount to acidify the phase and from 50 to 70 parts by weight of an asphalt phase, at least one of the phases having dispersed therein an amidoamine soap of the formula

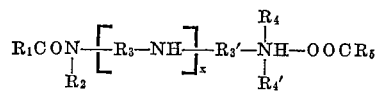

in which $R_1$ and $R_5$ are selected from the group consisting of alkyl, cycloalkyl, aryl, alkylaryl, arylalkyl, quinolyl and thienyl groups having from 6 to 20 carbon atoms; $R_2$, $R_4$ and $R_4'$ are selected from the group consisting of hydrogen and alkyl, cycloalkyl, aryl, alkylaryl, arylalkyl, and heterocyclic groups having from 1 to 19 carbon atoms, the heterocyclic groups being formed by the nitrogen atom with $R_4$ and $R_4'$; $R_3$ and $R_3'$ are selected from the group consisting of bivalent alkylene, arylene, arylalkylene, alkylarylene and diazylene radicals having from 2 to 18 carbon atoms and $x$ is an integer from zero to 4.

2. An asphalt emulsion as in claim 1 wherein at least one of $R_1$ and $R_5$ is an alkyl group having from 11 to 19 carbon atoms.

3. An asphalt emulsion as in claim 1 wherein at least one of $R_1$ and $R_5$ is an abietyl group.

4. An asphalt emulsion as in claim 1 wherein at least one of $R_1$ and $R_5$ is an aryl group.

5. An asphalt emulsion as in claim 1 comprising an excess of an amine having from 2 to 18 carbon atoms and from 1 to 5 amine groups.

6. An asphalt emulsion as in claim 5 wherein the amine is the same as that from which the amidoamine soap is derived.

7. An asphalt emulsion as in claim 1 wherein the said amidoamine soap is a reaction product of diethylene triamine and tall oil.

8. An asphalt emulsion as in claim 1 wherein the amine and the amidoamine soap are dispersed in the asphalt phase.

9. An asphalt emulsion as in claim 1 wherein the amine and amidoamine soap are dispersed in the aqueous phase.

10. In the method of construction comprising the application of aggregate and an asphalt emulsion to a surface, the improvement which comprises using as the asphalt emulsion a composition consisting essentially of from 30 to 50 parts by weight of an acidic aqueous phase comprising an acid having an ionization constant greater than about $1.7 \times 10^{-5}$ in an amount to acidify the phase and from 50 to 70 parts by weight of an asphalt phase, at least one of the phases having dispersed therein an amidoamine soap of the formula

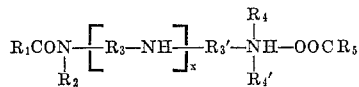

in which $R_1$ and $R_5$ are selected from the group consisting of alkyl, cycloalkyl, aryl, alkylaryl, arylalkyl, quinolyl and thienyl groups having from 6 to 20 carbon atoms; $R_2$, $R_4$ and $R_4'$ are selected from the group consisting of hydrogen and alkyl, cycloalkyl, aryl, alkylaryl, arylalkyl, and heterocyclic groups having from 1 to 19 carbon atoms, the heterocyclic groups being formed by the nitrogen atom with $R_4$ and $R_4'$; $R_3$ and $R_3'$ are selected from the group consisting of bivalent alkylene, arylene, arylalkylene, alkylarylene and diazylene radicals having from 2 to 18 carbon atoms and $x$ is an integer from zero to 4.

11. The method of claim 10 wherein the asphalt emulsion is mixed with the aggregate prior to application to the surface.

12. The method of claim 10 wherein the aggregate is applied to a surface and is thereafter covered with an asphalt emulsion.

References Cited by the Examiner
UNITED STATES PATENTS

| | | | |
|---|---|---|---|
| 2,317,959 | 4/1943 | Johnson et al. | 106—277 |
| 2,760,878 | 8/1956 | Lhorty | 106—277 |
| 2,891,873 | 6/1959 | Falkenberg et al. | 106—273 |
| 3,026,266 | 3/1962 | Mertens | 252—311.5 |

ALEXANDER H. BRODMERKEL, *Primary Examiner.*

JOSEPH REBOLD, MORRIS LIEBMAN, *Examiners.*